US012734020B2

(12) United States Patent
Xu et al.

(10) Patent No.: US 12,734,020 B2
(45) Date of Patent: Sep. 15, 2026

(54) ORTHODONTIC APPLIANCE AND ORTHODONTIC SYSTEM

(71) Applicant: GUANGZHOU OO MEDICAL SCIENTIFIC LIMITED, Guangdong (CN)

(72) Inventors: Zien Xu, Guangdong (CN); Jianwen Yu, Guangdong (CN); Tingjin Zhong, Guangdong (CN); Li Ji, Guangdong (CN)

(73) Assignee: GUANGZHOU OO MEDICAL SCIENTIFIC LIMITED, Guangdong (CN)

( * ) Notice: Subject to any disclaimer, the term of this patent is extended or adjusted under 35 U.S.C. 154(b) by 111 days.

(21) Appl. No.: 18/713,193

(22) PCT Filed: Oct. 27, 2022

(86) PCT No.: PCT/CN2022/127824
§ 371 (c)(1),
(2) Date: May 24, 2024

(87) PCT Pub. No.: WO2023/103633
PCT Pub. Date: Jun. 15, 2023

(65) Prior Publication Data

US 2025/0032224 A1 Jan. 30, 2025

(30) Foreign Application Priority Data

Dec. 6, 2021 (CN) ......................... 202111476485.8

(51) Int. Cl.
*A61C 7/22* (2006.01)
*A61C 7/14* (2006.01)
(Continued)

(52) U.S. Cl.
CPC ................ *A61C 7/22* (2013.01); *A61C 7/141* (2013.01); *A61C 7/282* (2013.01); *A61C 7/287* (2013.01); *A61C 7/34* (2013.01)

(58) Field of Classification Search
CPC ......... A61C 7/282; A61C 7/141; A61C 7/285; A61C 7/22; A61C 7/287
See application file for complete search history.

(56) References Cited

U.S. PATENT DOCUMENTS 3,158,934 A * 12/1964 Waldman ............... A61C 7/285 433/22
3,210,818 A * 10/1965 Walishein ............. A61C 7/285 439/814

(Continued)

FOREIGN PATENT DOCUMENTS

CN 105852994 8/2016
CN 105982745 10/2016

(Continued)

OTHER PUBLICATIONS

"International Search Report (Form PCT/ISA/210) of PCT/CN2022/127824", mailed on Jan. 18, 2023, with English translation thereof, pp. 1-6.

(Continued)

*Primary Examiner* — Nicholas D Lucchesi
(74) *Attorney, Agent, or Firm* — JCIPRNET

(57) ABSTRACT

An orthodontic appliance, includes a main body portion, and a traction component, a transmission component and a position occupation component which are independently provided. The traction component is detachably connected to the main body portion and/or the transmission component, so as to achieve switching between a working state and a non-working state; the transmission component and the position occupation component are provided on the main body portion, the transmission component is transmittingly (Continued)

connected to the position occupation component, and the main body portion is provided with a groove; when an effective space of the groove needs to be changed, the traction component is transmittingly connected to the transmission component, so as to drive the position occupation component to at least partially enter or exit the or move in the groove along the width direction of the groove, so as to change the effective space of the groove.

14 Claims, 9 Drawing Sheets

(51) Int. Cl.
*A61C 7/28* (2006.01)
*A61C 7/34* (2006.01)

(56) References Cited

U.S. PATENT DOCUMENTS

| | | | | |
|---|---|---|---|---|
| 3,238,619 | A * | 3/1966 | Brunson | A61C 7/12 433/13 |
| 4,171,568 | A * | 10/1979 | Forster | A61C 7/02 433/10 |
| 4,353,692 | A * | 10/1982 | Karrakussoglu | A61C 7/12 433/12 |
| 5,954,502 | A * | 9/1999 | Tuenge | A61C 7/14 433/18 |
| 2007/0248928 | A1 | 10/2007 | Damon | |
| 2007/0259301 | A1* | 11/2007 | Hagelganz | A61C 7/285 433/10 |
| 2008/0014544 | A1* | 1/2008 | Nucera | A61C 7/28 433/8 |
| 2011/0123942 | A1* | 5/2011 | Rudman | A61C 7/285 433/10 |
| 2011/0269093 | A1* | 11/2011 | Waugh, Jr. | A61C 7/287 433/10 |
| 2015/0017597 | A1* | 1/2015 | Solano Reina | A61C 7/141 433/10 |
| 2015/0182306 | A1* | 7/2015 | Chen | A61C 7/143 433/9 |
| 2016/0175072 | A1* | 6/2016 | Andreiko | A61C 7/30 433/10 |
| 2018/0055604 | A1* | 3/2018 | Ji | A61C 7/14 |
| 2019/0117338 | A1* | 4/2019 | Ji | A61C 7/22 |
| 2019/0167385 | A1* | 6/2019 | Alikhani | A61C 7/22 |
| 2020/0060790 | A1* | 2/2020 | Buddemeyer | A61C 7/34 |
| 2020/0093577 | A1* | 3/2020 | Cosse | A61C 7/14 |

FOREIGN PATENT DOCUMENTS

| | | |
|---|---|---|
| CN | 109091254 | 12/2018 |
| CN | 209122498 | 7/2019 |
| CN | 110251252 | 9/2019 |
| CN | 112237491 | 1/2021 |
| CN | 213156610 | 5/2021 |
| CN | 214484674 | 10/2021 |
| CN | 216628766 | 5/2022 |
| CN | 217186510 | 8/2022 |
| CN | 217186511 | 8/2022 |
| CN | 217186512 | 8/2022 |

OTHER PUBLICATIONS

"Written Opinion of the International Searching Authority (Form PCT/ISA/237) of PCT/CN2022/127824", mailed on Jan. 18, 2023, pp. 1-5.

* cited by examiner

ORTHODONTIC APPLIANCE AND ORTHODONTIC SYSTEM

CROSS-REFERENCE TO RELATED APPLICATION

This application is a 371 of international application of PCT application serial no. PCT/CN2022/127824, filed on Oct. 27, 2022, which claims the priority benefit of China application no. 202111476485.8, filed on Dec. 6, 2021. The entirety of each of the above-mentioned patent applications is hereby incorporated by reference herein and made a part of this specification.

TECHNICAL FIELD

The invention relates to the field of orthodontic technology, and particularly relates to an orthodontic appliance and an orthodontic system.

RELATED ART

The orthodontic appliance includes the orthodontic bracket and the buccal tube, the appliance is an important component of fixed orthodontic technology and the appliance used to correct tooth alignment malformations. The appliance is directly fixed on the surface of the crown, the archwire passes through the bracket to perform various types of correction force on the teeth to achieve the purpose of orthodontics.

The applicant filed an invention application on Jan. 29, 2015, titled Traction Bracket, Orthodontic System, And Orthodontic Method Thereof, and the patent number is 201510046931.X.

This patent discloses a traction element, which includes a locking bolt and a traction bolt. The difference between the locking bolt and the traction bolt is that the end of the locking bolt protrudes. When the locking bolt engages the locking traction hole of the main body portion, the end of the locking bolt may enter the main trench to lock the archwire, when the traction bolt engages the locking traction hole of the main body portion, the end of the traction bolt does not enter the main trench, does not produce a locking effect on the archwire, and is only used for traction.

This bracket may implement a traction locking system: the bracket with the locking bolt is an active bracket, and the bracket with the traction bolt is a passive bracket. Two ends of the rubber band are hung on the locking bolt and the traction bolt respectively, and the elastic contraction of the rubber band acts on the locking bolt and the traction bolt. Due to the high friction between the locking bolt and the archwire, the active bracket pulls the passive bracket, and the bracket with the traction bolt drives the teeth closer to the teeth where the bracket with the locking bolt is located, thereby achieving staged correction of misaligned teeth.

In order to realize any switching between active and passive brackets, the locking bolt has to have a traction function. However, this traction locking system cannot solve the situation where only locking is required without traction. When only locking is required, the bolt head of the locking bolt continues to protrude, causing significant discomfort to the patient. Also, a series of oral health problems caused by the traction bolt are generated, such as hanging food residue to breed bacteria, and abrading the oral mucosa to induce ulcers.

SUMMARY

In view of the above technical problems, the invention provides a multi-function adjustable orthodontic appliance and an orthodontic system.

The technical solution adopted by this invention to solve this technical problem is:

An orthodontic appliance, which includes a main body portion and a traction component, a transmission component, and a position occupying component disposed independently of each other, the traction component is detachably connected to the main body portion and/or the transmission component to perform switching between a working state and a non-working state; the transmission component and the position occupying component are disposed at the main body portion, the transmission component is linkagely connected to the position occupying component, the main body portion is disposed with a trench, when an effective space of the trench needs to be changed, the traction component is linkagely connected to the transmission component, thereby driving the position occupying component to at least partially enter or exit the trench or move in the trench along a trench width direction, so as to change the effective space of the trench; and in a process of driving the position occupying component to move, the traction component does not switch the states.

In an embodiment, the transmission component is disposed with a transmission fitting member, and correspondingly, the traction component is disposed with an engaging end, when the engaging end of the traction component is engaged with the transmission fitting member, the traction component is linked to the transmission component.

In an embodiment, the transmission fitting member is a snapping protrusion, an elastic buckle, a snap joint, a thread, a protrusion or a hole with a non-circular cross-section.

In an embodiment, the transmission component is connected to the engaging end of the traction component, the engaging end of the traction component is not engaged with the transmission fitting member, and the traction component does not link the transmission component.

In an embodiment, the main body portion is disposed with an open containing cavity communicated with the trench, the position occupying component is disposed in the trench or disposed in the containing cavity and the trench, and the traction component connects the containing cavity and/or the transmission component.

In an embodiment, the containing cavity is disposed with a limiting structure, so that the transmission component rotates in the containing cavity but does not move axially; the position occupying component is limited by the containing cavity and/or the trench and does not rotate.

In an embodiment, the position occupying component is disposed with a moving member, the moving member is formed in a plate shape or a block shape, and a side of the moving member abuts a bottom wall of the trench or an inner wall of the containing cavity, so that the moving member is limited from rotating; the transmission component is connected to the moving member by screw connection.

In an embodiment, the trench divides the main body portion into two working wings, the containing cavity is disposed on any one of the working wings or penetrates the trench to be disposed on the two working wings; the transmission component and the position occupying component are disposed on the same working wing, or the transmission component and the position occupying component are disposed on different working wings.

In an embodiment, a bottom plate is further provided, and the bottom plate is disposed on a bottom surface of the main body portion; a cover body portion is further provided, and the cover body portion is disposed on a surface of the main body portion.

An orthodontic system includes an archwire and at least one orthodontic appliance as described in any one of the above embodiments.

Compared with existing technology, the positive effects are as follows:

1. This invention introduces the transmission component, the traction function and the trench positioning function are separated without affecting each other, the functions may be implemented freely and independently, and the functions may be implemented simultaneously or not implemented simultaneously. This invention can reproduce the traction locking system of the related patent, and can also achieve the position occupying function independently. When the position occupying function is implemented independently, the traction component is detached, and then the traction component does not protrude to cause problems such as discomfort, uncleanness, and unhygienic.
2. This invention uses the traction component as an extension of the transmission component on the main body portion to reduce the engaging level of the screwing tool, which facilitates the operation for the doctor, and the working efficiency of the doctor is improved.
3. This invention redefines the locking function. The purpose of the related art locking bolt entering the trench is to abut against the archwire and perform static friction against the archwire, while the position occupying component of the invention has more possibilities. The position occupying component of the invention can not only realize the locking function, but also adjust the depth of the position occupying component in the trench, that is, the position occupying component only occupies a certain position in the trench, thereby adjusting the activity space of the archwire in the trench, controlling the torque of the archwire effectively, and reducing the number of archwire replacements, then, the torque can be expressed relatively coherently, softly, and accurately, and significant correction effect is achieved, the operating time of the doctor is reduced, the work efficiency is improved, and the mental and financial burdens of the patient are reduced.

The invention will be further described below together with the accompanying drawings and Examples.

DESCRIPTION OF EMBODIMENTS

Figure 1:
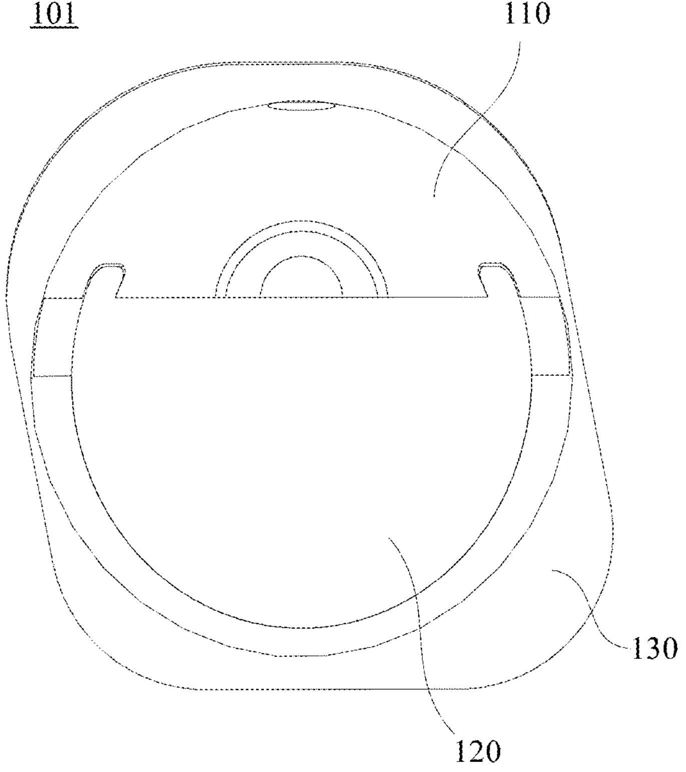
FIG. 1 is a schematic structural view of a bracket in a first state in Example 1.
Figure 2:
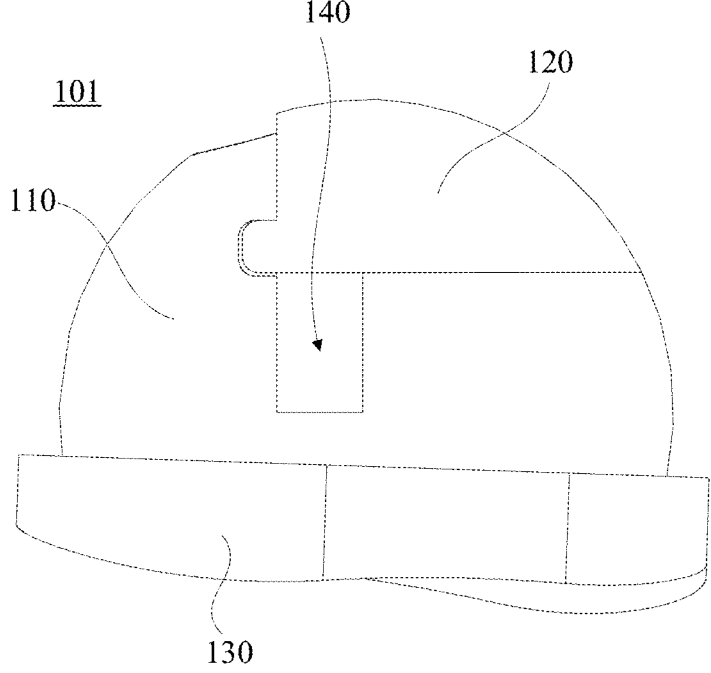
FIG. 2 is a side view in FIG. 1.
Figure 3:
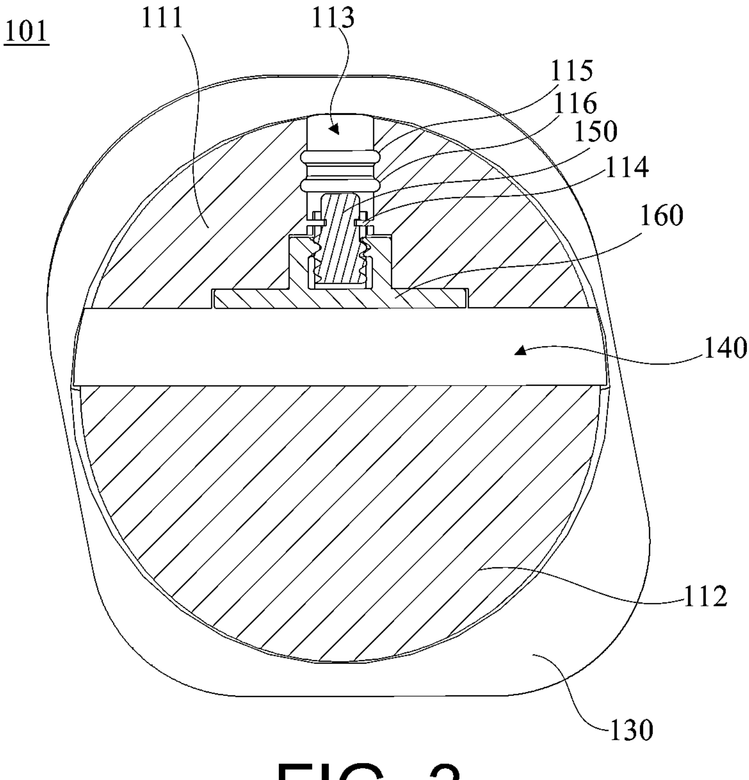
FIG. 3 is a cross-sectional view in FIG. 1.
Figure 4:
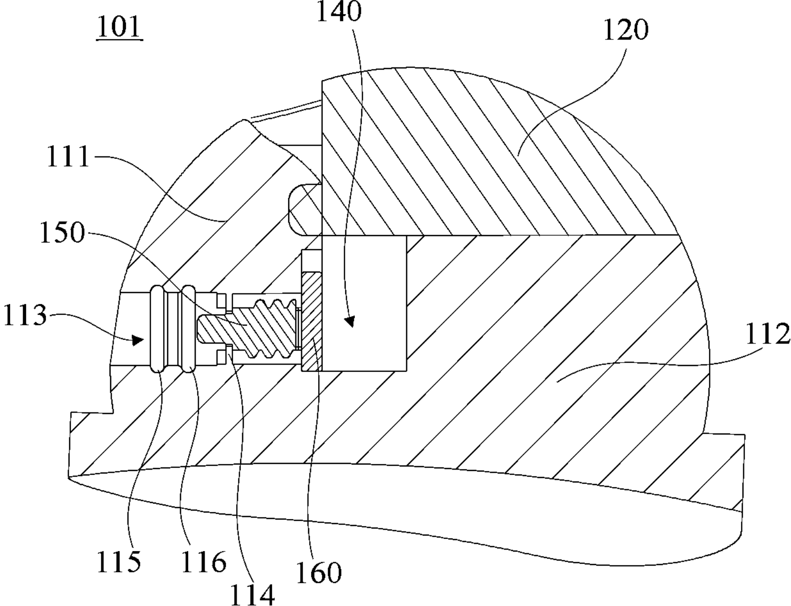
FIG. 4 is another cross-sectional view in FIG. 1.

It should be noted that the orthodontic appliance mentioned in this invention refers to an orthodontic bracket or a buccal tube, or other appliances with similar functions and similar structures.

Unless otherwise stated, in the following structural description, the reference system of the maxillary teeth needs to be used to describe embodiments of the invention. Therefore, as used herein, the terms used to describe the orthodontic appliance such as labial side, lingual side, mesial, distal, occlusal, and gingival are relative to the selected reference system. However, embodiments of the invention are not limited to the selected reference system and the terms described, as the orthodontic appliance may be used on other teeth within the oral cavity and in other directions.

For example, the bracket or the buccal tube may also be coupled to the lingual surface of the tooth and fall within the scope of the invention. Persons skilled in the art are aware that the descriptive terms used herein may not be directly applicable when there are changes in the reference system. However, embodiments of the invention are intended to be independent of position and direction within the oral cavity and the relevant terms used to describe the embodiments are merely to provide a clear description of the embodiments in the drawings. Likewise, the related terms such as labial side, lingual side, mesial, distal, occlusal, and gingival do not limit the invention to a particular position or direction.

The related terms labial side, lingual side, mesial, distal, occlusal, and gingival are industry terms for orthodontic treatment. Taking one maxillary tooth as an example, the surface of the tooth may be roughly divided into six surfaces. The surface of the tooth occupying the mandibular teeth is the occlusal surface; the surface of the tooth connected to the attached gum tissue is the gingival surface; the occlusal surface and the gingival surface are opposite, and the direction formed by the occlusal surface and the gingival surface is also called the gingival and jaw direction. The surface of the tooth facing the lip is the labial side surface, and the surface of the tooth facing the tongue is the lingual side surface. The labial side surface and the lingual side surface are opposite, and the direction formed by the labial side surface and the lingual side surface is also called the labiolingual direction. The two surfaces of the tooth in contact with the adjacent teeth are the mesial surface and the distal surface, in which the difference lies in the distance from the middle part, and the directions formed by the two surfaces are also called the mesiodistal directions.

And in the description of direction, such as the labiolingual direction, the description generally refers to both directions. However, the labial-lingual direction, for example, specifically refers to a single direction, that is, the direction from the labial side surface to the lingual side surface, and the description is used as a distinction.

Example 1

As shown in FIG. 1 to FIG. 12, a bracket 101 in Example 1 includes a main body portion 110, a cover body portion 120, and a bottom plate 130. The main body portion 110 is disposed with a trench 140 penetrating two sides of the main body portion 110 in the mesiodistal direction. The trench 140 divides the main body portion 110 into two components, including a first working wing 111 and a second working wing 112. The trench 140 is used to accommodate an archwire. The trench 140 has two opposite side walls and a bottom wall, with an upper opening.

The bottom plate 130 is connected to the bottom surface of the main body portion 110, and the bottom plate 130 is used to bond the bracket 101 to the tooth surface.

The cover body portion 120 is connected to the surface of the main body portion 110 and is used to open or close the trench 140. In this embodiment, preferably, the cover body portion 120 is slidably connected to the labial side surface of the second working wing 112.

For the invention, the bottom plate 130 and the cover body portion 120 are optional components. As a preferred embodiment, the two components are disposed.

In the disclosure, the bracket 101 is further disposed with a transmission component 150, a position occupying component 160, and a traction component 170. The transmission component 150, the position occupying component 160, and the traction component 170 are independent components and are not fixedly connected to one another. The main body portion 110 is disposed with an open containing cavity 113 communicated with the trench 140. The containing cavity 113 accommodates the transmission component 150. The transmission component 150 is linkagely connected to the position occupying component 160. The position occupying component 160 is accommodated in the containing cavity 113 and the trench 140, and the position occupying component 160 is limited by the containing cavity 113 and/or the trench 140 and cannot rotate. The traction component 170 is detachably connected to the containing cavity 113. The transmission component 150 is disposed with a transmission fitting member 151. Correspondingly, the traction component 170 is disposed with an engaging end 172 for engaging with the transmission fitting member 151, when the engaging end 172 of the traction component 170 is engaged with the transmission fitting member 151, the traction component 170 links the transmission component 150. When the effective space of the trench 140 needs to be changed, the traction component 170 is linkagely connected to the transmission component 150, thereby driving the position occupying component 160 to at least partially enter or exit the trench 140 or move in the trench 140 along the trench width direction, so as to change the effective space of the trench 140; and in the process of driving the position occupying component 160 to move, the traction component 170 does not switch states.

Specifically, the containing cavity 113 is disposed at the first working wing 111 of the main body portion 110. The containing cavity 113 penetrates the surface of the main body portion 110 and the trench 140 in the gingival and jaw direction. The opening of the containing cavity 113 is disposed on the gingival surface of the main body portion 110. The containing cavity 113 is disposed with a limiting structure, so that the transmission component 150 rotates in the containing cavity 113 but cannot move axially. Specifically, the limiting structure is a first flange 114 disposed on the inner wall of the containing cavity 113. The containing cavity 113 is further disposed with a first annular groove 115 and a second annular groove 116 for matchingly engaging with the traction component 170.

Figure 11:
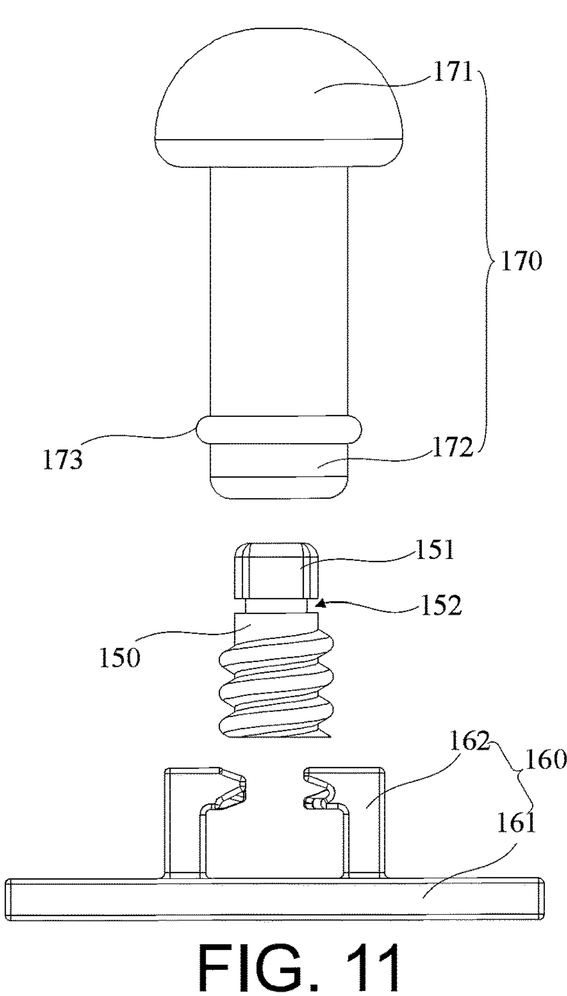
FIG. 11 is an exploded schematic view of a traction component, a transmission component, and a position occupying component in Example 1.
Figure 12:
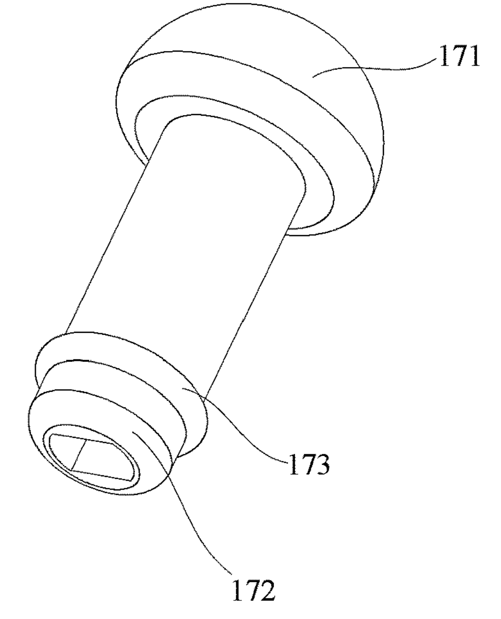
FIG. 12 is a schematic structural view of the traction component in FIG. 11.

Please refer to FIG. 11 and FIG. 12. The transmission component 150 is a screw rod, and an end thereof is disposed with the transmission fitting member 151 for matching the traction component 170. The transmission fitting member 151 is a square protrusion. Correspondingly, the engaging end 172 of the traction component 170 is disposed with a square hole. Another end of the transmission component 150 is provided with an external thread. The middle part of the transmission component 150 is recessed to form a third annular groove 152. The third annular groove 152 is located between the external thread and the transmission fitting member 151. The transmission component 150 is accommodated in the containing cavity 113. The end with the transmission fitting member 151 faces the opening of the containing cavity 113, the threaded end of the transmission component 150 faces the trench 140, and the transmission component 150 is substantially perpendicular to the trench 140. The first flange 114 and the third annular groove 152 are matchingly connected to limit the transmission component 150 in the containing cavity 113 to only rotate around the gingival and jaw direction as the axis but not to move significantly axially.

The position occupying component 160 includes a moving member 161 disposed in the trench 140. The moving member 161 is formed in a plate shape or a block shape, and two opposite plate surfaces thereof correspond to the two side walls of the trench 140 respectively. The surface facing the containing cavity 113 is a connection surface of the moving member 161, and the other surface is a functional surface of the moving member 161. The connection surface of the moving member 161 is disposed with a pair of clamping arms 162. The clamping arms 162 may move in the trench 140 along with the moving member 161, and may also reach deep into the containing cavity 113. A receiving cavity able to receive the threaded end of the transmission component 150 is formed between the clamping arms 162, and opposite surfaces of the clamping arms 162 are respectively provided with internal threads. The clamping arms 162 are matchingly connected with the threaded end of the transmission component 150, so as to realize the linkage connection of the transmission component 150 and the position occupying component 160. A side of the moving member 161 in this embodiment abuts the bottom wall of the trench 140, so that the moving member 161 cannot rotate along with the transmission component 150, which forces the moving member 161 to convert rotation into movement to realize the position occupying function of the position occupying component 160.

The traction component 170 is a bolt body, and an end thereof radially protrudes to form a bolt head, which is a traction end 171; another end of the traction component 170 is recessed to form an engaging interface, which is the engaging end 172, matched with the transmission fitting member 151 of the transmission component 150. The middle part of the traction component 170 radially protrudes to form a second flange 173, matched with the first annular groove 115 or the second annular groove 116 of the containing cavity 113, and used for detachable connection to the main body portion 110. When the second flange 173 of the traction component 170 matches the first annular groove 115 of the containing cavity 113, the traction component 170 does not engage with the transmission component 150; when the second flange 173 of the traction component 170 matches the second annular groove 116 of the containing cavity 113, that is, the traction component 170 further reaches deep into the containing cavity 113, the traction component 170 engages with the transmission component 150.

Working Principle of Example 1

Referring to FIG. 1 to FIG. 4, in a first state, the connection surface of the moving member 161 is closely attached to the side wall of the trench 140 connecting the containing cavity 113, and the effective space of the trench 140 is the largest. The traction component 170 is detached from the main body portion 110. For the bracket 101 in the first state, neither the traction function nor the position occupying function is applied.

Figure 5:
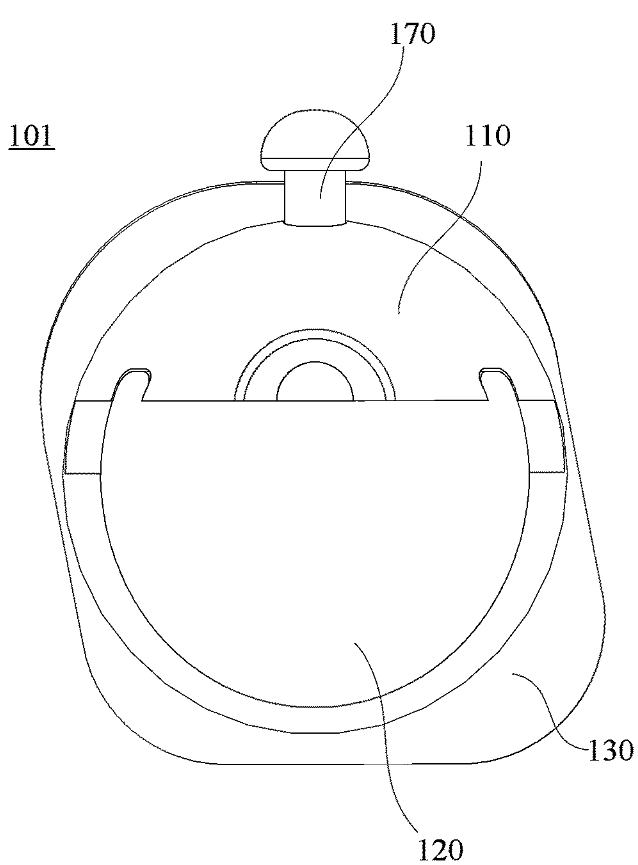
FIG. 5 is a schematic structural view of the bracket in a second state in Example 1.
Figure 6:
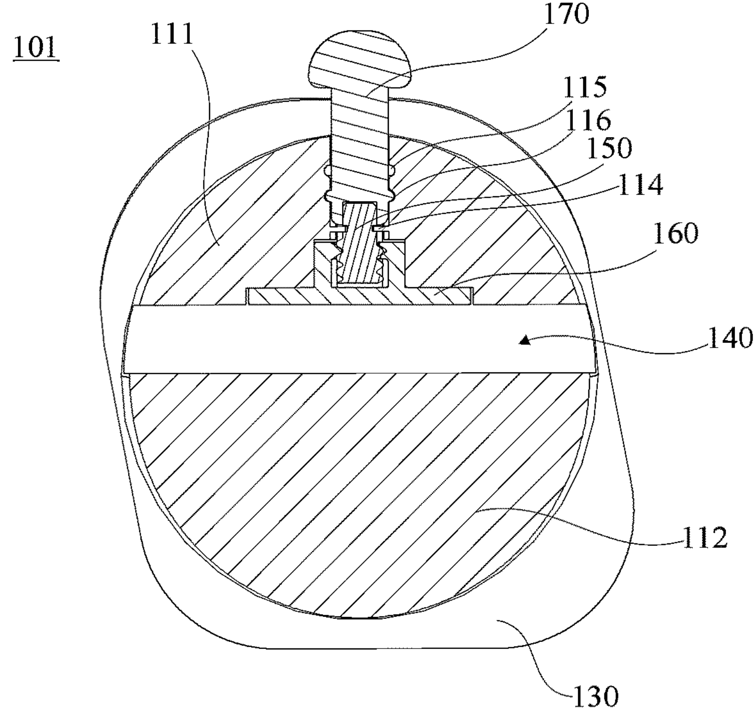
FIG. 6 is a cross-sectional view in FIG. 5.

Referring to FIG. 5 and FIG. 6, in a second state, based on the first state, the traction component 170 is engaged. Specifically, the engaging end 172 of the traction component 170 is engaged with the opening of the containing cavity 113, the second flange 173 is snap-fitted with the first annular groove 115 of the containing cavity 113, the traction end 171 of the traction component 170 is located above the main body portion 110, and the traction function may be performed. Moreover, the traction component 170 is only connected to the containing cavity 113 and not to the transmission component 150, and the engaging end 172 of the traction component 170 is not engaged with the transmission fitting member 151 of the transmission component 150.

Figure 7:
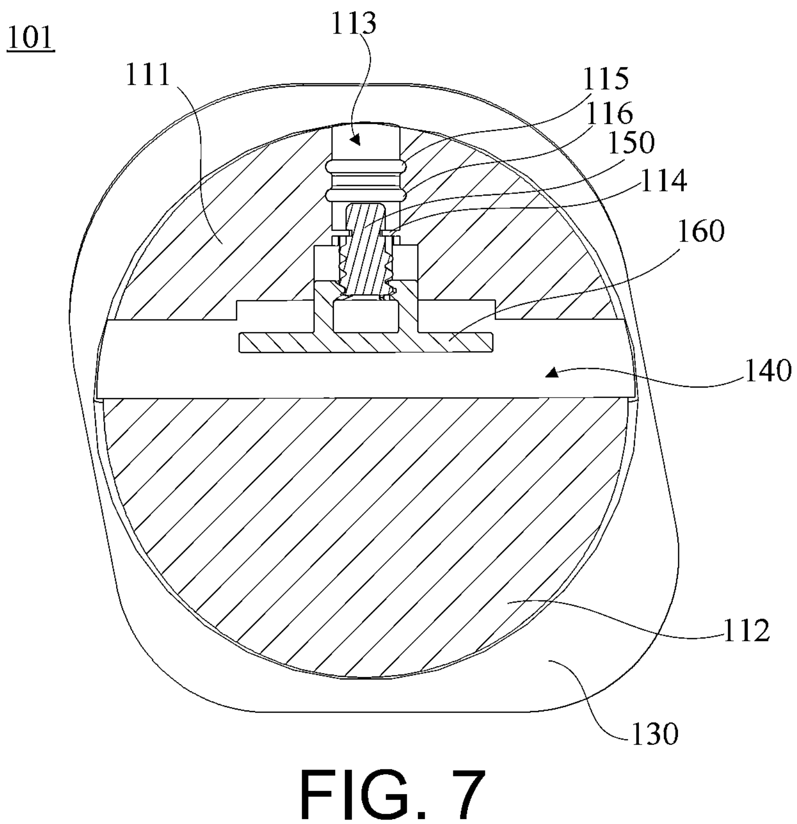
FIG. 7 is a cross-sectional view of the bracket in a third state in Example 1.
Figure 8:
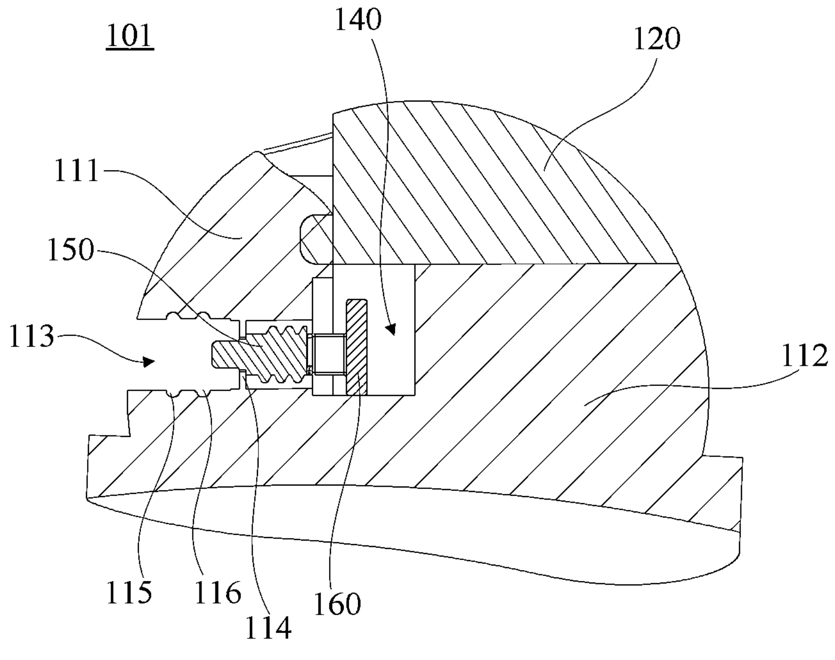
FIG. 8 is another cross-sectional view in FIG. 7.

Referring to FIG. 7 and FIG. 8, in a third state, based on the second state, the effective space of the trench 140 is adjusted, and the position occupying function is implemented. Specifically, the second flange 173 matches with the second annular groove 116 of the containing cavity 113, and the engaging end 172 of the traction component 170 engages with the transmission fitting member 151 of the transmission component 150. Then, the traction component 170 is linkagely connected to the transmission component 150. The traction component 170 drives the transmission component 150 to rotate forward or reverse, allowing the threaded end of the transmission component 150 to reach deep into or slightly exit the receiving cavity of the position occupying component 160. Since the containing cavity 113 limits the axial movement of the transmission component 150, and at the same time, the position occupying component 160 is limited from rotating and the rotation is passively converted into movement, so that the position occupying component 160 moves in the trench width direction. For example, forward rotation of the traction component 170 may allow the transmission component 150 to drive the position occupying component 160 closer to the second working wing 112, and the effective space of the trench 140 becomes smaller; reverse rotation of the traction component 170 may allow the transmission component 150 to drive the position occupying component 160 away from the second working wing 112, and the effective space of the trench 140 becomes larger. When the engaging end 172 of the traction component 170 is separated from the transmission fitting member of the transmission component 150, the effective space of the trench 140 is re-determined. In the situation that the engaging end 172 of the traction component 170 is separated from the transmission fitting member 151 of the transmission component 150, the situation includes that the traction component 170 is detached and that the traction component 170 is only connected to the containing cavity 113 but not to the transmission component 150. In the third state, the traction component 170 is detached. In the third state, the bracket 101 does not have the traction function.

Figure 9:
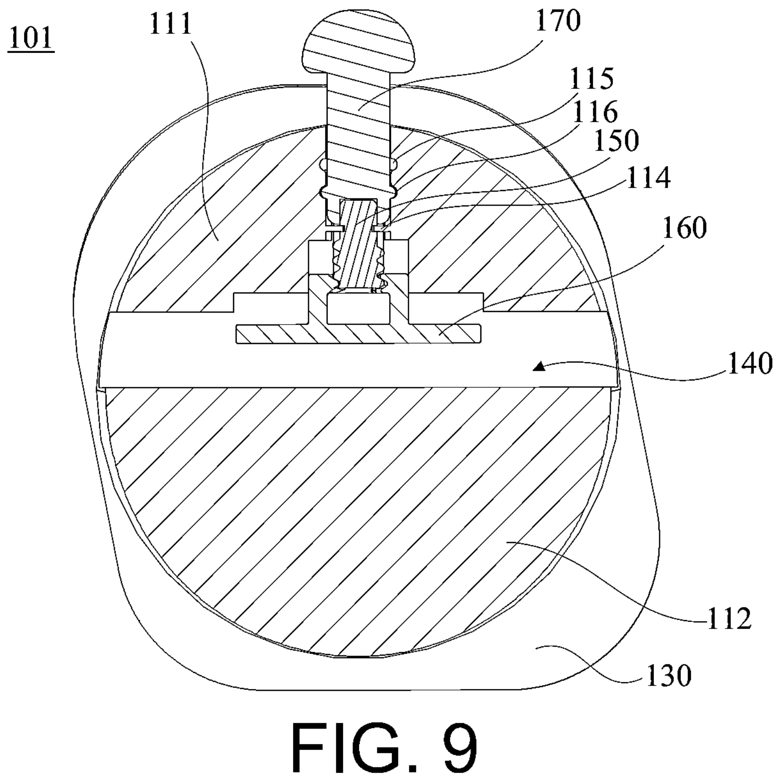
FIG. 9 is a cross-sectional view of the bracket in a fourth state in Example 1.
Figure 10:
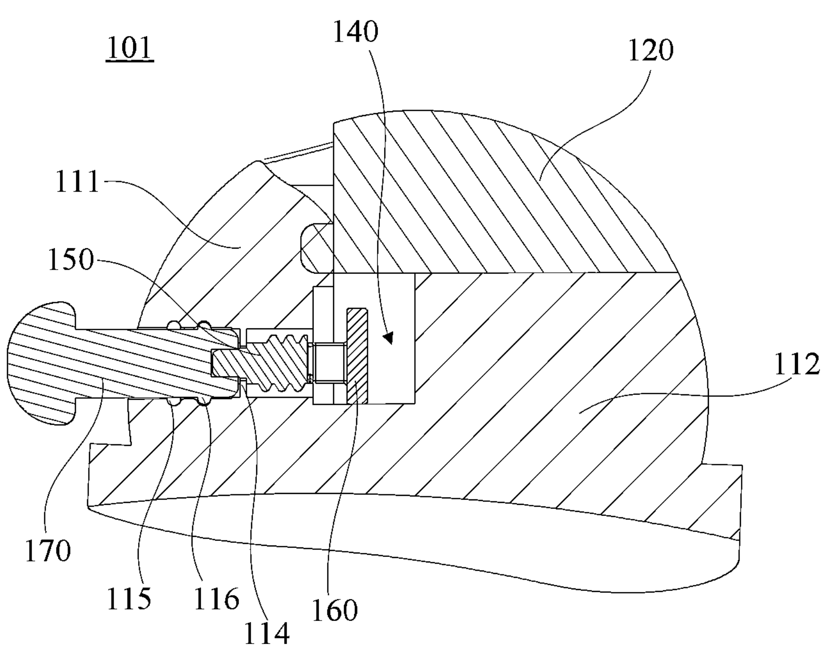
FIG. 10 is another cross-sectional view in FIG. 9.

Referring to FIG. 9 and FIG. 10, in a fourth state, based on the third state, the traction component 170 is engaged. Specifically, the engaging end 172 of the traction component 170 is engaged with the opening of the containing cavity 113, the second flange 173 is snap-fitted with the first annular groove 115 of the containing cavity 113, the traction component 170 is detachably connected to the containing cavity 113, the traction end 171 of the traction component 170 is located above the main body portion 110, and the traction function may be performed.

The first state, the second state, the third state, and the fourth state may be switched freely, and there is no strict transformation order between the four states. After the traction component 170 is engaged with the main body portion 110, selecting whether to drive the position occupying component 160 to move may be achieved by switching to engage with the first annular groove 115 or the second annular groove 116.

It should be noted that the trench 140 is disposed with the two opposite side walls, and the total accommodation space of the trench 140 is between the two opposite side walls. In the invention, the position occupying component 160 is disposed in the trench 140 to re-divide the space in the trench 140. In some cases, as the position occupying component 160 moves in the trench 140, the total accommodation space of the trench 140 remains unchanged, and the position occupying component 160 only axially divides the trench 140 into two spaces. However, generally, only one of the two spaces may be used to store the archwire. Then, the space formed by the functional surface of the position occupying component 160 and the side wall of the trench 140, which may be used to store the archwire, is the effective space of the trench 140 as defined by the invention. Therefore, as the position occupying component 160 changes the position or shape thereof in the trench 140, the total accommodation space of the trench 140 may not change, but the effective space of the trench 140 shall change. The real-time size of the effective space is based on the radial size of the largest archwire that may be stored in the space at the moment. The understanding of the effective space of the trench 140 is the same as in other embodiments of the invention, so detailed will not be repeated below.

Compared with the related art, Example 1 can reproduce the traction locking system of the related patent, and can also achieve the position occupying function independently. Example 1 structurally separates the traction component 170 and the position occupying component 160, and introduces the transmission component 150, so that the traction function and the position occupying function of the trench 140 are separated without affecting each other, the functions may be implemented freely and independently, and the functions may be implemented simultaneously or not implemented simultaneously. The traction component 170 may be disposed at the main body portion 110 to achieve traction, or may be detached from the main body portion 110 so that the traction function is disabled. The transmission component 150 in Example 1 is a screw rod, which is hidden in the main body portion 110. After the traction component 170 is detached, there are no significant protruding foreign objects on the surface of the bracket 101, and this arrangement does not cause issues such as discomfort, uncleanness, and unhygienic to the patient. The position occupying component 160 may limit the position of the archwire or even lock the archwire, and may also be closely attached to the side wall of the trench 140 to allow the maximum effective space. The position occupying component 160 may adjust the space of the trench 140, so as to meet the needs of different treatment stages.

In addition, the traction component 170 is used as an extension of the transmission component 150 on the main body portion 110, a screwing tool is linked to the traction component 170, the traction component 170 is linked to the transmission component 150, and the transmission component 150 is linked to the position occupying component 160, thereby the effective space of the trench 140 is changed. The transmission chain is used to reduce the engaging level of the screwing tool, which facilitates the operation for the doctor, and the working efficiency of the doctor is improved.

Example 2

As shown in FIG. 13 to FIG. 16, the structure of a bracket 102 in Example 2 is basically the same as in Example 1. The main differences are:

A traction component 270 in Example 2 is not detachably connected to a containing cavity 213, and the traction component 270 in Example 2 is detachably connected to a transmission component 250. Therefore, the containing cavity 213 of the main body portion is not disposed with a first annular groove 214 and a second annular groove 214 configured to matchingly engage with the traction component 270.

In Embodiment 2, the traction component 270 and the transmission component 250 are detachably connected, and an engaging end of the traction component 270 is provided with an internal thread. Correspondingly, the transmission component 250 is a screw rod, and a transmission fitting member 251 thereof is of an external thread.

A connection relationship between the containing cavity 213 and the transmission component 250 in Example 2 is as follows. The containing cavity 213 is disposed with the annular groove 214. Correspondingly, the transmission component 250 is the screw rod, a flange 252 is disposed in the middle of the screw rod, and the annular groove 214 is matchingly engaged with the flange 252 to limit the transmission component 250 in the containing cavity 213 to only rotate around the gingival and jaw direction as the axis but not to move significantly axially.

Working Principle of Example 2

Figure 13:
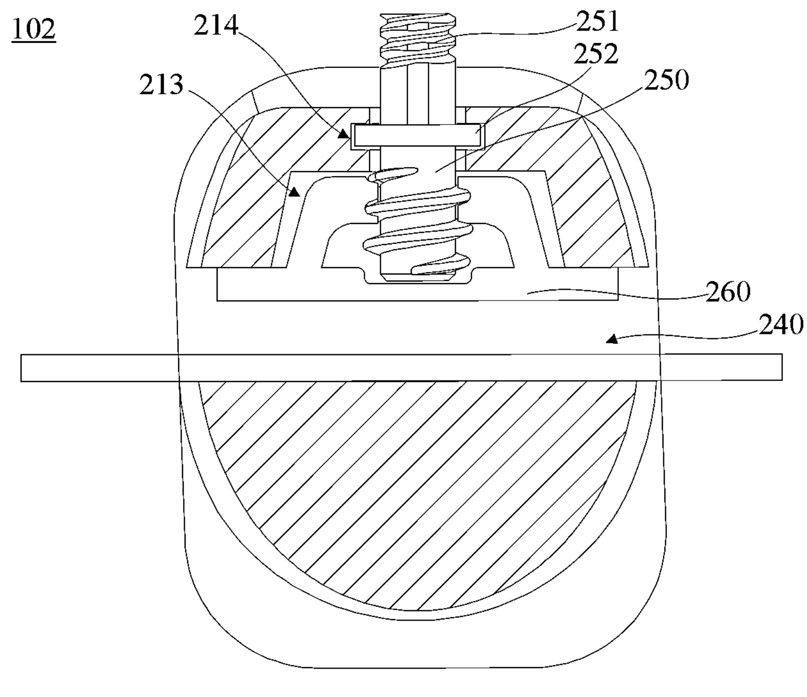
FIG. 13 is a cross-sectional view of the bracket in the first state in Example 2.

Referring to FIG. 13, in the first state, the connection surface of the moving member is closely attached to the side wall of a trench 240 connecting the containing cavity 213, and the effective space of the trench 240 is the largest. The traction component 270 is detached from the main body portion. For the bracket 102 in the first state, neither the traction function nor the position occupying function is applied.

Figure 14:
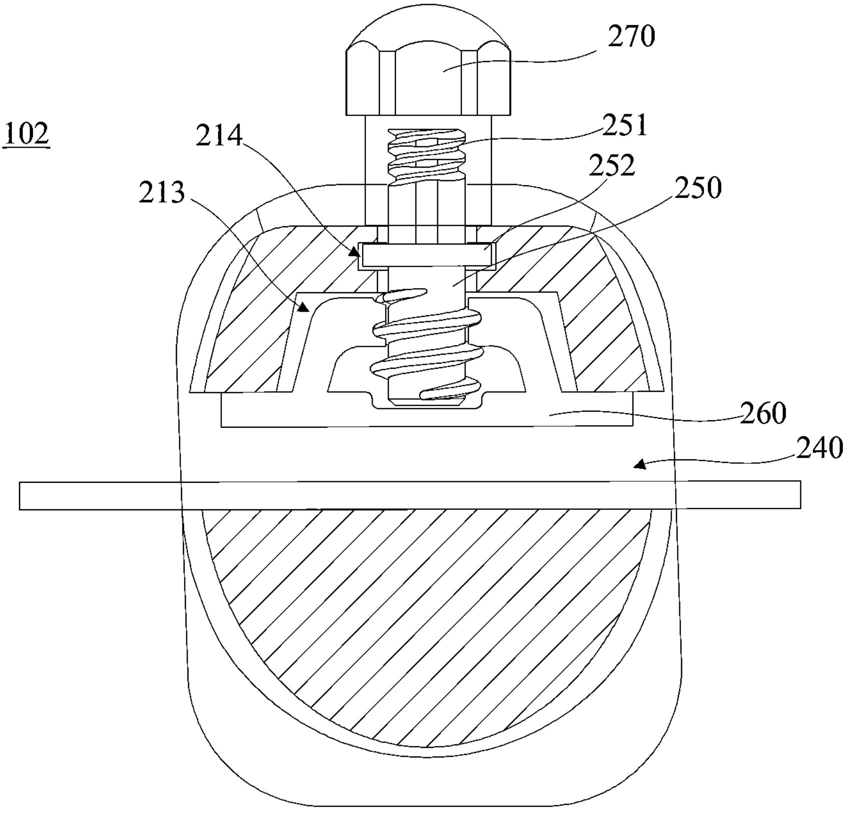
FIG. 14 is a cross-sectional view of the bracket in the second state in Example 2.

Referring to FIG. 14, in the second state, based on the first state, the traction component 270 is engaged. Specifically, the engaging end of the traction component 270 is engaged with the opening of the containing cavity 213, the engaging end of the traction component 270 is interference-fitted with the transmission fitting member 251 of the transmission component 250, the traction end of the traction component 270 is located above the main body portion, and the traction function may be performed.

Figure 15:
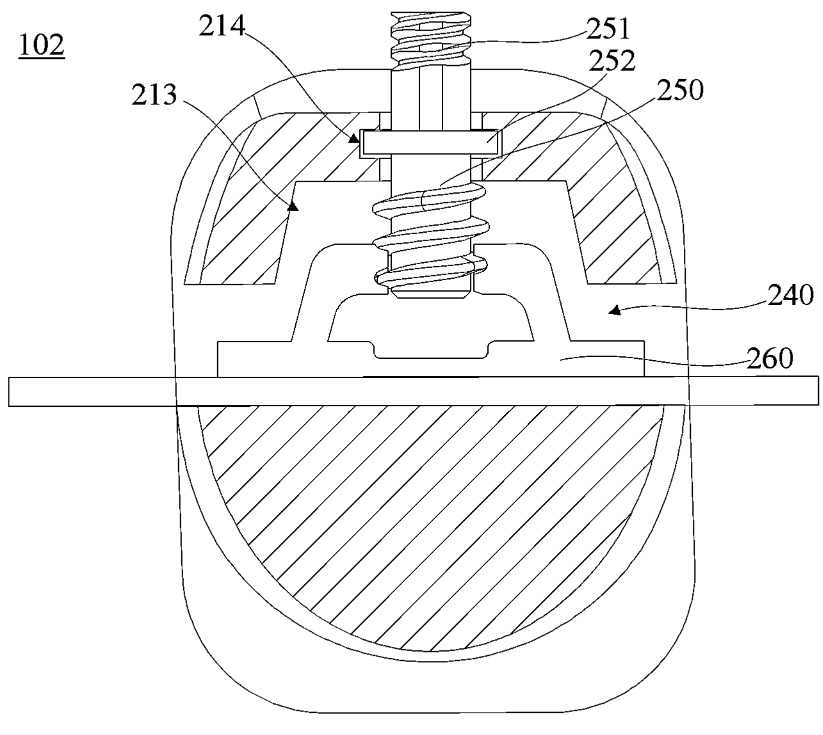
FIG. 15 is a cross-sectional view of the bracket in the third state in Example 2.

Referring to FIG. 15, in the third state, based on the second state, the effective space of the trench 240 is adjusted, and the position occupying function is implemented. Specifically, the traction component 270 drives the transmission component 250 to rotate forward or reverse, allowing the threaded end of the transmission component 250 to reach deep into or slightly exit the receiving cavity of the position occupying component 260. Since the containing cavity 213 limits the axial movement of the transmission component 250, and at the same time, the position occupying component 260 is limited from rotating and the rotation is passively converted into movement, so that the position occupying component 260 moves in the trench width direction. For example, forward rotation of the traction component 270 may allow the transmission component 250 to drive the position occupying component 260 closer to the second working wing, and the effective space of the trench 240 becomes smaller; reverse rotation of the traction component 270 may allow the transmission component 250 to drive the position occupying component 260 away from the second working wing, and the effective space of the trench 240 becomes larger.

Figure 16:
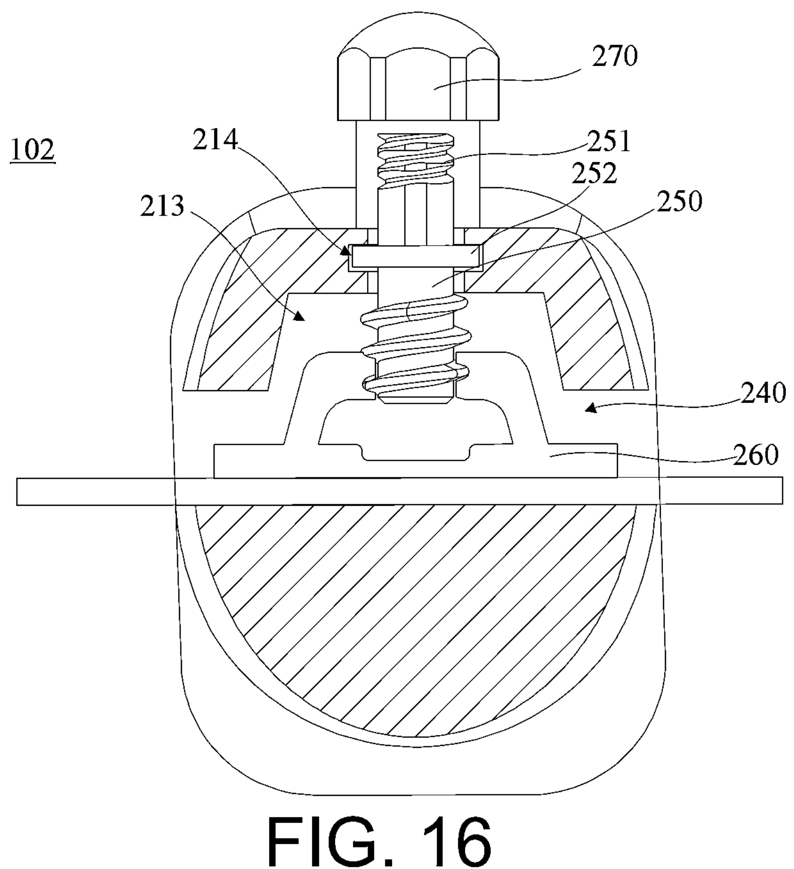
FIG. 16 is a cross-sectional view of the bracket in the third state in Example 2.

Referring to FIG. 16, in the fourth state, based on the third state, the traction component 270 is detached.

The first state, the second state, the third state, and the fourth state may be switched freely, and there is no strict transformation order between the four states.

Example 3

Figure 17:
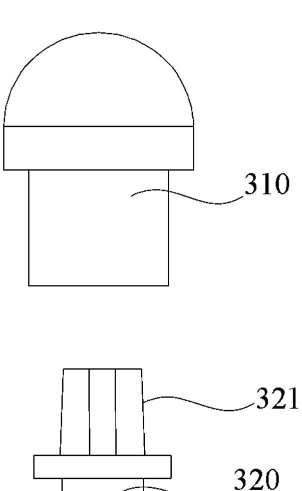
FIG. 17 is an exploded schematic view of the traction component and a screw rod in Example 3.
Figure 18:
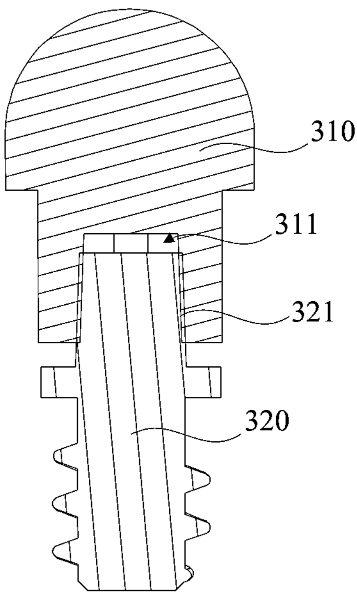
FIG. 18 is a cross-sectional view of the traction component shown in FIG. 17 after engaging with the screw.

As shown in FIG. 17 and FIG. 18, the structure of the bracket in Example 3 is basically the same as in Example 2. The main difference is that: a traction component 310 and a transmission component 320 are detachably connected by screw connection. Specifically, the engaging end of the traction component 310 in Example 2 is disposed with a square hole 311. Correspondingly, the transmission fitting member of the transmission component 320 is a square protrusion 321. The traction component 310 is interference-fitted and linked with the transmission component 320.

The working principle of Example 3 is the same as Example 2.

Example 4 is basically the same as Example 1. The difference is that: the transmission component in Example 4 is a threaded bushing, which is in the shape of a sleeve with both ends open. The threaded bushing is provided with an external thread, and the bushing is in screw connection with the position occupying component. The threaded bushing is disposed with an inner wall to form a hexagonal hole, which is the transmission fitting member, and the fitting position is linkagely connected to the engaging end of the traction component. Correspondingly, the engaging end of the traction component is in the shape of a hexagonal column.

When the second flange of the traction component in Example 4 matches the first annular groove, the traction component does not engage with the transmission component; when the second flange of the traction component matches the second annular groove of the containing cavity, that is, the traction component further reaches deep into the containing cavity, the traction component engages with the transmission component.

Example 5

Example 5 is basically the same as Example 2. The difference is that: the transmission component in Example 5 is a threaded bushing, which is in the shape of a sleeve with both ends open. The threaded bushing is provided with an external thread, and the bushing is in screw connection with the position occupying component. The inner wall of the threaded bushing is provided with an internal thread, which is the transmission fitting member, and the fitting position is linkagely connected to the engaging end of the traction component. Correspondingly, the engaging end of the traction component is of an external thread.

The connection relationship of the traction component in Example 5 is only detachably connected to the transmission component, and is not connected to the containing cavity.

Regarding the screw connection, persons skilled in the art understand that the number of thread turns required to connect the traction component and the transmission component is significantly greater than the number of thread turns required for the movement stroke of the position occupying component. Moreover, after the traction component is fastened tightly to the transmission component by screw connection, the traction component and the transmission component also have a certain amount of static friction. Rotating the traction component to adjust the position occupying component does not affect the connection relationship between the traction component and the transmission component.

Example 6

Example 6 is basically the same as Example 1. The difference is that:

The traction component in Example 6 is not detachably connected to the containing cavity, and the traction component in Example 6 is detachably connected to the transmission component. Therefore, the containing cavity of the main body portion is not disposed with the first annular groove and the second annular groove configured to matchingly engage with the traction component.

The traction component in Example 6 is detachably connected with the transmission component, and the outer wall of the engaging end of the traction component in Example 6 is disposed with an elastic buckle. Specifically, the engaging end of the traction component is recessed to form in the shape of a sleeve, the side wall of the engaging end has a blind groove axially opened from the opening, and along the outer wall of the opening edge of the groove is disposed with a bump to form the elastic buckle.

The transmission component in Example 6 is a threaded bushing, and the threaded bushing is in the shape of a sleeve with one end open and the other end closed. The threaded bushing is accommodated in the containing cavity, in which the open end of the threaded bushing corresponds to the opening of the containing cavity, the closed end faces the trench, and the central axis of the threaded bushing is basically perpendicular to the trench. The inner wall of the threaded bushing is disposed with an annular groove and a snap joint respectively. Both the annular groove and the snap joint are used to engage with the engaging end of the traction component, and the snap joint is the transmission fitting member. The outer wall of the threaded bushing close to the closed end is provided with an external thread, which is connected to the position occupying component by screw connection.

Working Principle of Example 6

In the first state, the connection surface of the moving member is closely attached to the side wall of the trench connecting the containing cavity, and the effective space of the trench is the largest. The traction component is detached from the main body portion. For the bracket in the first state, neither the traction function nor the position occupying function is applied.

In the second state, based on the first state, the traction component is engaged.

Specifically, the engaging end of the traction component enters the opening of the containing cavity, and the engaging end of the traction component engages with the inner wall of the threaded bushing. Specifically, the elastic buckle of the engaging end of the traction component slides into the annular groove, the traction end of the traction component is located above the main body portion, and the traction function may be performed. Also, at this time, the traction component is connected to the transmission component, but the traction component is not engaged with the transmission fitting member. Therefore, the traction component is not linked to the transmission component.

In the third state, based on the second state, the effective space of the trench is adjusted, and the position occupying function is implemented. Specifically, the elastic buckle of the engaging end of the traction component slides into the snap joint of the transmission component to match and snap-fit. The rotational kinetic energy of the traction component drives the transmission component to rotate. The transmission component is driven to rotate forward or reverse, allowing the threaded end of the transmission component to reach deep into or slightly exit the receiving cavity of the position occupying component. Since the containing cavity limits the axial movement of the transmission component, and at the same time, the position occupying component is limited from rotating and the rotation is passively converted into movement, so that the position occupying component moves in the trench width direction. For example, forward rotation of the traction component may allow the transmission component to drive the position occupying component closer to the second working wing, and the effective space of the trench becomes smaller; reverse rotation of the traction component may allow the transmission component to drive the position occupying component away from the second working wing, and the effective space of the trench becomes larger. When the engaging end of the traction component is separated from the transmission fitting member of the transmission component, the effective space of the trench is re-determined. In the situation that the engaging end of the traction component is separated from the transmission fitting member of the transmission component, the situation includes that the traction component is detached and that the elastic buckle slides out of the snap joint and slides into the annular groove. In the third state, the elastic buckle slides out of the snap joint and slides into the annular groove, and the traction component is not detached from the transmission component. The traction component is connected to the transmission component but not linked. The traction end of the traction component is above the main body portion. In the third state, the bracket has the traction function.

In the fourth state, based on the third state, the traction component is detached.

The first state, the second state, the third state, and the fourth state may be switched freely, and there is no strict transformation order between the four states.

Regarding the connection relationship of the traction component, it may be seen from the above embodiments that the traction component may be detachably connected to the containing cavity, and the traction component may also be detachably connected to the transmission component. In other embodiments, the traction component may also be detachably connected to both the containing cavity and the transmission component. When the traction component is disposed on the main body portion and the traction end is located above the main body portion, then the traction component is in a working state; otherwise, the traction component is in a non-working state.

Regarding the connection manner of the traction component, it may be seen from the above embodiments that the traction component is movably connected to the containing cavity and/or the transmission component, specifically a detachable connection. In the connection manner, the detachable connection methods include snap-fitting, interference-fitting, and screw connection. Snap-fitting further includes engagement between the elastic buckle and the snap joint, fastening between the snapping protrusion and the snap joint, and the engagement between the annular groove and the flange. For example: the outer wall of the engaging end of the traction component is disposed with a hemispherical protrusion, and correspondingly, the inner wall of the containing cavity or the inner wall of the transmission component is recessed with a hemispherical snap joint, or the positions of the protrusion and the snap joint may be interchanged; alternatively, the outer wall of the engaging end of the traction component is disposed with the elastic buckle, and correspondingly, the inner wall of the containing cavity or the inner wall of the transmission component is recessed to form a snap joint, or the positions of the elastic buckle and the snap joint may be interchanged; alternatively, the traction component is interference-fitted with the containing cavity, or the traction component is interference-fitted with the transmission component; alternatively, the engaging end of the traction component is provided with the external thread, and correspondingly, the inner wall of the containing cavity is provided with the internal thread; alternatively, the engaging end of the traction component is provided with the external thread or the internal thread, and correspondingly, the inner wall of the transmission component is provided with the internal thread or the external thread; alternatively, the traction component is snap-fitted with both the transmission component and the containing cavity.

In the above embodiments, the traction end of the traction component is the bolt head. In other embodiments, the traction end may be formed in a hook-shape or other shapes for traction.

In the above embodiments, the transmission fitting member is a square protrusion. In other embodiments, corresponding to the shape of the engaging end of different screwing tools, the transmission fitting member may be an inner n-angle hole or an n-angle protrusion, in which n is a natural number and 1<n. Furthermore, the transmission fitting member may also be an elliptical hole, an elliptical protrusion, a petal-shaped protrusion, or a petal-shaped hole, or any hole or protrusion with a non-circular cross-section, so that the position occupying component may be driven to rotate after the screwing tool is matched with the position occupying component.

In the above embodiments, the containing cavity contains the transmission component and the position occupying component to avoid exposure of the components, the structure is built-in, the appearance is clean and aesthetical, and the comfort of the patient is improved. In addition, when the traction component is selected to be connected to the containing cavity, then the containing cavity is also helpful in avoiding interference between the traction function and the position occupying function. Specifically, compared with the conventional traction component fixedly connected to the main body portion, the traction component of the invention has a certain degree of mobility. Also, when the traction component performs traction, the traction component may undergo a slight position deviation or deflection due to the force of the ligation wire or rubber band. In the same way, the position occupying component also has a certain degree of mobility. When the position occupying component performs the position occupying function, a slight position deviation may occur due to the force of the archwire. For embodiments in which the traction component is linkagely connected to the position occupying component, the deviation may be transmitted. Certainly, the deviation and the indirect effect are not significant, but if the traction component is directly connected to the containing cavity, then the problem can be avoided from the root cause.

In other embodiments, the containing cavity is not limited to openings at both ends, and may have other shapes, or may have a higher degree of communication with the outside world. For non-self-locking orthodontic brackets, the surface of the working wing is inherently disposed with some grooves, which are spaces suitable for accommodating the position occupying component, and the space is the containing cavity, so that the transmission component and the position occupying component do not protrude significantly from the main body portion. The manner of exposure of the transmission component and the position occupying component can effectively reduce processing difficulty and production costs.

In each embodiment, the limited connection between the containing cavity and other components is achieved by disposing the annular groove and the flange for snap-fitting. Persons skilled in the art may make simple interchanges based on common knowledge.

In other embodiments, the trench divides the main body portion into two working wings, and the containing cavity penetrates the trench to be disposed on the two working wings.

In the above embodiments, the transmission component and the position occupying component are disposed at the first working wing. In other embodiments, both the transmission component and the position occupying component may also be disposed at the second working wing. The disposition of the transmission component and the position occupying component are not affected by whether the working wing is disposed with the cover body portion.

Furthermore, in other embodiments, the transmission component and the position occupying component may be disposed at different working wings. For example, the transmission component is disposed at the first working wing, and the position occupying component is disposed at the second working wing. The transmission component penetrates the bottom wall of the trench and is engaged with the position occupying component. The functional surface of the moving member faces the side wall of the trench close to the first working wing. The moving member moves close to or away from the first working wing to change the effective space of the trench.

In Example 1, the bottom side of the moving member abuts the bottom wall of the trench, so that the position occupying component cannot rotate. In other embodiments, a limiting structure is disposed on the moving member, and the limiting structure forms a limiting connection with the inner wall of the containing cavity or the side wall of the trench so that the position occupying component cannot rotate. Specifically, the moving member is disposed with a connecting rod, which is vertically connected to the connection surface of the moving member. Correspondingly, the side wall of the trench is disposed with a blind hole perpendicular to the surface of the side wall, and the connecting rod and the blind hole match each other. As the moving member moves in the trench, the connecting rod reaches deep into or slightly exits the blind hole, and the moving member cannot rotate.

In Example 1, 2, and 3, the clamping arms of the position occupying component are disposed with internal threads to engage with the external thread of the transmission component. In other embodiments, the threads may also be interchanged to achieve the same technical effect.

In the above embodiments, the moving member and the clamping arms are integrally formed. In other embodiments, the moving member and the clamping arms are not integrally formed, and the moving member and the clamping arms may be connected by welding, snap-fitting, screwing, interference-fitting, or other methods. In Example 1, 2, and 3, the clamping arm is a structure protruding from the moving member. Persons skilled in the art should know that the clamping arm is only a structure providing the receiving cavity and the internal thread to connect the threaded end of the transmission component. Therefore, based on the concept of this invention, the function of the clamping arm may be built into the moving member. For example, if the moving member is a thick enough plate, a connection surface thereof is partially recessed to form a receiving cavity, and the inner wall of the receiving cavity is provided with an internal thread, then the technical effect of the invention can also be achieved.

In Example 1, the moving member is disposed in the trench, and the clamping arm thereof reaches deep into the containing cavity, that is, the position occupying component is disposed in the trench and the containing cavity. In other embodiments, such as the situation that the function of the clamping arm is built into the moving member, the position occupying component may be disposed in the trench completely.

Furthermore, the moving member is disposed in the trench, and only moves in the trench; alternatively, the moving member is disposed in the containing cavity and the trench, and the moving member may completely exit the trench or completely enter the trench; alternatively, the moving member may completely exit the trench and only partially enter the trench; alternatively, the moving member may partially exit the trench and partially enter the trench; alternatively, the moving member may only partially exit the trench but may fully enter the trench. For the design of the moving member that does not exit the trench at all, the moving member may extend to both sides to cover the side walls of the trench, or the side walls of the trench may be recessed to form a groove to accommodate the moving member so that the moving member is flush with the side walls, as shown in Example 1.

All the above embodiments adopt a design in which the main body portion and the cover body portion are combined into a smooth curved surface. This is a preferred embodiment that effectively reduces the foreign body sensation and discomfort of the user. In other embodiments, the main body portion may be a conventional square self-locking bracket. The connection between the cover body portion and the main body portion is not limited to a sliding connection, and other embodiments may be, for example, a rotating connection, and a flipping connection.

In other embodiments, the main body portion is a non-self-locking bracket, that is, the cover body portion for covering the trench is not disposed. In addition, in other embodiments of the invention, the bottom plate is not disposed, as long as the bottom surface of the main body portion has a structure adhering to the tooth surface.

The above embodiments are all orthodontic brackets. In other embodiments, the orthodontic appliance of the invention is a buccal tube. Some conventional buccal tubes are not designed with working wings, but the buccal tube is disposed with a trench, and the trench divides the main body portion of the buccal tube into two components. This invention is applicable as long as the scope involves orthodontic appliances with a trench and the trench divides the main body portion thereof into two components.

This application further provides an orthodontic appliance, which includes an archwire and at least one bracket as described above, and the archwire is accommodated in the trench of the bracket.

The invention is not limited to the embodiments. If various modifications or variations of the invention do not deviate from the spirit and scope of the invention, and if the modifications and variations fall within the claims and equivalent technical scope of the invention, then the invention is also intended to include the modifications and variations.

What is claimed is:

1. An orthodontic appliance, comprising: a main body portion and a traction component, a transmission component, and a position occupying component disposed independently of each other, wherein the traction component is detachably connected to the main body portion and/or the transmission component to perform switching between a working state and a non-working state; the transmission component and the position occupying component are disposed at the main body portion, the transmission component is linkagely connected to the position occupying component, the main body portion is disposed with a trench, when an effective space of the trench needs to be changed, the traction component is linkagely connected to the transmission component, thereby driving the position occupying component to at least partially enter or exit the trench or move in the trench along a trench width direction, so as to change the effective space of the trench; when the position occupying component is driven to be moved, the working state or the non-working state is not switched by the traction component, wherein the transmission component is disposed with a transmission fitting member, and correspondingly, the traction component is disposed with an engaging end, when the engaging end of the traction component is engaged with the transmission fitting member, the traction component is linked to the transmission component, wherein when the transmission component is connected to the engaging end of the traction component, and the engaging end of the traction component is not engaged with the transmission fitting member, the traction component does not link the transmission component.

2. The orthodontic appliance as claimed in claim 1, wherein the transmission fitting member is a snapping protrusion, an elastic buckle, a snap joint, a thread, a protrusion with a non-circular cross-section, or a hole with a non-circular cross-section.

3. The orthodontic appliance as claimed in claim 1, wherein the main body portion is disposed with a containing cavity openly formed and communicated with the trench, the position occupying component is disposed in the trench or disposed in the containing cavity and the trench, and the traction component connects the containing cavity and/or the transmission component.

4. The orthodontic appliance as claimed in claim 3, wherein the containing cavity is disposed with a limiting structure, so that the transmission component rotates in the containing cavity but does not move axially; the position occupying component is limited by the containing cavity and/or the trench and does not rotate.

5. The orthodontic appliance as claimed in claim 4, wherein the position occupying component is disposed with a moving member, the moving member is formed in a plate shape or a block shape, and a side of the moving member abuts a bottom wall of the trench or an inner wall of the containing cavity, so that the moving member is limited from rotating; the transmission component is connected to the moving member by screw connection.

6. The orthodontic appliance as claimed in claim 3, wherein the trench divides the main body portion into two working wings, the containing cavity is disposed on any one of the working wings or penetrates the trench to be disposed on the two working wings; the transmission component and the position occupying component are disposed on a same working wing of the two working wings, or the transmission component and the position occupying component are disposed on the two working wings, respectively.

7. The orthodontic appliance as claimed in claim 1, wherein a bottom plate is further comprised, and the bottom plate is disposed on a bottom surface of the main body portion; a cover body portion is further comprised, and the cover body portion is disposed on a surface of the main body portion.

8. An orthodontic system, comprising: an archwire and an orthodontic appliance as claimed in claim 1.

9. An orthodontic system, comprising: an archwire and an orthodontic appliance as claimed in claim 2.

10. An orthodontic system, comprising: an archwire and an orthodontic appliance as claimed in claim 3.

11. An orthodontic system, comprising: an archwire and an orthodontic appliance as claimed in claim 4.

12. An orthodontic system, comprising: an archwire and an orthodontic appliance as claimed in claim 5.

13. An orthodontic system, comprising: an archwire and an orthodontic appliance as claimed in claim 6.

14. An orthodontic system, comprising: an archwire and an orthodontic appliance as claimed in claim 7.

* * * * *